United States Patent
Gersch

(10) Patent No.: US 9,521,835 B1
(45) Date of Patent: Dec. 20, 2016

(54) FISHING POLE HOLDER FOR A DOCK RAILING

(71) Applicant: William Gersch, Las Vegas, NV (US)

(72) Inventor: William Gersch, Las Vegas, NV (US)

( * ) Notice: Subject to any disclaimer, the term of this patent is extended or adjusted under 35 U.S.C. 154(b) by 163 days.

(21) Appl. No.: 14/468,417

(22) Filed: Aug. 26, 2014

(51) Int. Cl.
*A01K 97/10* (2006.01)

(52) U.S. Cl.
CPC .................................... *A01K 97/10* (2013.01)

(58) Field of Classification Search
CPC ........................................................ A01K 97/10
USPC ......... 43/21.2; 248/511, 534, 538, 540, 541, 248/200, 229.1, 229.13, 229.15, 229.16, 226.11, 248/230.1, 230.4, 230.7, 231.51, 231.71, 248/231.81; 24/499, 507–510
See application file for complete search history.

(56) References Cited

U.S. PATENT DOCUMENTS

| | | | | | |
|---|---|---|---|---|---|
| 417,997 | A | * | 12/1889 | Dupuis | G09F 17/00 248/535 |
| 1,015,717 | A | * | 1/1912 | Shimer | A01K 97/10 248/540 |
| 1,179,073 | A | * | 4/1916 | Clements | D06F 55/00 24/508 |
| 1,192,112 | A | * | 7/1916 | Porter | A01K 97/10 43/21.2 |
| 1,283,511 | A | * | 11/1918 | Heidtmann | B60R 13/00 43/21.2 |
| 1,459,438 | A | * | 6/1923 | Brand | A01K 97/10 43/21.2 |
| 1,467,834 | A | * | 9/1923 | Bruch | B60R 13/00 43/21.2 |
| 1,520,543 | A | * | 12/1924 | Meachen | A01K 97/10 43/21.2 |
| 1,703,554 | A | * | 2/1929 | Slauter | A01K 97/10 248/534 |
| 1,760,592 | A | * | 5/1930 | Gift | A01K 97/10 248/538 |
| 1,761,497 | A | * | 6/1930 | Smith | A01K 97/10 248/230.4 |
| 1,786,254 | A | * | 12/1930 | Meehan | A01K 97/10 248/534 |
| 1,789,509 | A | * | 1/1931 | Bergstrom | A01K 97/10 248/540 |
| 1,987,842 | A | * | 1/1935 | Sampson | A01K 97/10 43/21.2 |
| 2,003,535 | A | * | 6/1935 | Haskin | A01K 97/10 248/540 |
| 2,063,924 | A | * | 12/1936 | Hanko | A47G 33/105 248/229.23 |

(Continued)

FOREIGN PATENT DOCUMENTS

| | | | | |
|---|---|---|---|---|
| DE | 4218277 A1 | * | 12/1993 | ............. A01K 97/10 |
| GB | 2164531 A | * | 3/1986 | ............. A01K 97/10 |

(Continued)

*Primary Examiner* — Darren W Ark

(57) ABSTRACT

The fishing pole holder for a dock railing includes a clamp assembly that is configured to be secured to a dock railing. The clamp assembly is adjustable, and can secure itself to dock railings of differing geometries. The clamp assembly includes a biasing member that provides a secure connection to the dock railing. The clamp assembly includes a rod holder that extends away from the dock railing. The rod holder is configured to receive a fishing pole there against. The fishing pole is ideally rested on a ground surface, and leans at an acute angle upwardly in order to rest against the rod holder. The rod holder is further defined with a "u"-shaped bracket that enables the fishing rod to rest there against.

1 Claim, 4 Drawing Sheets

(56) References Cited

U.S. PATENT DOCUMENTS

| | | | | |
|---|---|---|---|---|
| 2,146,350 A * | 2/1939 | Roberts | A01K 97/10 | 248/229.13 |
| 2,171,665 A * | 9/1939 | Meltzer | A61G 7/05 | 248/229.26 |
| 2,209,697 A * | 7/1940 | Kislingbury | D06F 55/00 | 24/507 |
| 2,265,330 A * | 12/1941 | Waddle | A01K 97/10 | 43/21.2 |
| 2,452,279 A * | 10/1948 | Young | A01K 97/10 | 43/21.2 |
| 2,491,008 A * | 12/1949 | Lake | A01K 97/10 | 43/21.2 |
| 2,513,475 A * | 7/1950 | Grevich | A01K 97/10 | 43/21.2 |
| 2,516,759 A * | 7/1950 | Diderrich | A01K 97/10 | 248/540 |
| 2,541,146 A * | 2/1951 | Bahr | A01K 97/10 | 248/538 |
| 2,542,253 A * | 2/1951 | King | A01K 97/10 | 43/21.2 |
| 2,546,280 A * | 3/1951 | Stein | A01K 97/10 | 43/21.2 |
| 2,553,070 A * | 5/1951 | Van Megroot | A45D 29/06 | 24/510 |
| 2,557,728 A * | 6/1951 | Drumb | A01K 97/10 | 248/540 |
| 2,694,538 A * | 11/1954 | Consolo | A01K 97/10 | 248/535 |
| 2,721,680 A * | 10/1955 | Steckman | B60R 5/006 | 43/21.2 |
| 2,798,684 A * | 7/1957 | Walden | A01K 97/10 | 248/511 |
| 2,939,662 A * | 6/1960 | Johnson | A01K 97/10 | 248/534 |
| 2,961,209 A * | 11/1960 | Willey | A01K 97/10 | 248/540 |
| 2,981,509 A * | 4/1961 | Messenger | A01K 97/10 | 248/538 |
| 2,988,311 A * | 6/1961 | Bow | A01K 97/10 | 248/514 |
| 3,030,681 A * | 4/1962 | Phillips | G09F 3/16 | 248/229.13 |
| 3,273,766 A * | 9/1966 | Cosentino | A44C 5/0046 | 224/197 |
| 3,550,824 A * | 12/1970 | Bohanski | F21V 21/08 | 24/3.2 |
| D219,970 S * | 2/1971 | Salzmann | | 43/21.2 |
| 3,655,155 A * | 4/1972 | Taylor | A01K 97/10 | 248/511 |
| 4,007,902 A * | 2/1977 | Pettee | A01K 97/10 | 43/21.2 |
| 4,036,368 A * | 7/1977 | Munsch | A01K 97/10 | 248/539 |
| 4,156,982 A * | 6/1979 | Phillips, Jr. | A01K 97/10 | 43/21.2 |
| 4,198,775 A * | 4/1980 | Leisner | A01K 97/10 | 43/21.2 |
| 4,270,724 A * | 6/1981 | McMullen | F16M 13/02 | 248/534 |
| 4,517,761 A * | 5/1985 | Bleggi | A01K 97/10 | 43/21.2 |
| 4,528,768 A * | 7/1985 | Anderson | A01K 97/10 | 43/21.2 |
| 4,658,533 A * | 4/1987 | Mendoza | A01K 97/10 | 43/21.2 |
| 4,739,914 A * | 4/1988 | Pothetes | A01K 97/10 | 224/247 |
| 4,759,963 A * | 7/1988 | Uso, Jr. | A01K 97/08 | 43/54.1 |
| 4,852,291 A * | 8/1989 | Mengo | A01K 97/10 | 43/21.2 |
| 4,877,165 A * | 10/1989 | Behrle | A01K 97/10 | 43/21.2 |
| 4,883,290 A * | 11/1989 | Landa | A45F 5/021 | 24/336 |
| 5,142,809 A * | 9/1992 | O'Brien | A01K 97/10 | 43/21.2 |
| 5,237,769 A * | 8/1993 | Navarro | A01K 97/12 | 43/21.2 |
| 5,295,321 A * | 3/1994 | Matura | A01K 97/10 | 43/21.2 |
| 5,437,122 A * | 8/1995 | Wilson | A01K 97/10 | 43/21.2 |
| D366,147 S * | 1/1996 | Marks | D22/138 | |
| 5,560,137 A * | 10/1996 | Herring | A01K 97/10 | 43/21.2 |
| 5,561,937 A * | 10/1996 | Johnson | A01K 97/10 | 43/21.2 |
| 5,571,228 A * | 11/1996 | McMurtrie | A01K 97/10 | 43/21.2 |
| 5,573,167 A * | 11/1996 | Bebb | A01K 97/10 | 43/21.2 |
| 5,632,112 A * | 5/1997 | Steinborn | A01K 97/10 | 43/21.2 |
| 5,910,004 A * | 6/1999 | Antosh | A01K 87/08 | 43/21.2 |
| 6,138,976 A * | 10/2000 | Fahringer, Sr. | A01K 97/10 | 248/534 |
| 6,253,484 B1 * | 7/2001 | O'Connor | A01K 97/10 | 43/21.2 |
| 6,276,651 B1 * | 8/2001 | Dolan | B25B 5/10 | 248/538 |
| 6,421,948 B1 * | 7/2002 | Craig | A01K 97/01 | 43/21.2 |
| D480,782 S * | 10/2003 | DeBerry | D22/147 | |
| 6,672,559 B1 * | 1/2004 | Boldia | A01K 97/10 | 248/540 |
| 6,898,893 B1 * | 5/2005 | Mukdaprakorn | A01K 97/10 | 43/21.2 |
| 6,931,782 B1 * | 8/2005 | Pitcock | A01K 97/08 | 43/21.2 |
| 6,962,018 B1 * | 11/2005 | King | A01K 97/10 | 43/21.2 |
| 7,254,915 B2 * | 8/2007 | Mrotek | A01K 97/10 | 43/21.2 |
| 7,422,188 B1 * | 9/2008 | Schlosser | A45B 1/04 | 248/535 |
| 8,216,258 B2 * | 7/2012 | Skipper | A61B 5/6826 | 24/509 |
| 8,240,079 B2 * | 8/2012 | Wakefield | A01K 97/10 | 43/21.2 |
| 8,327,575 B1 | 12/2012 | Zalewski | | |
| 8,333,358 B2 * | 12/2012 | Carnes | A01K 97/10 | 43/21.2 |
| 8,800,196 B2 * | 8/2014 | Baumann | A01K 97/10 | 43/21.2 |
| 9,161,523 B2 * | 10/2015 | Conry | A01K 97/10 | |
| 2005/0005500 A1 * | 1/2005 | Howley | A01K 97/10 | 43/21.2 |
| 2005/0235548 A1 * | 10/2005 | Barron | A01K 97/10 | 43/21.2 |
| 2005/0279008 A1 * | 12/2005 | Hernandez | A01K 97/10 | 43/21.2 |
| 2006/0218844 A1 * | 10/2006 | Oliver | A01K 97/10 | 43/21.2 |
| 2007/0044367 A1 * | 3/2007 | Slatter | A01K 97/10 | 43/21.2 |
| 2007/0108364 A1 * | 5/2007 | Metheny | A45B 11/00 | 248/541 |
| 2008/0295383 A1 * | 12/2008 | Wakefield | A01K 97/10 | 43/21.2 |
| 2010/0237219 A1 * | 9/2010 | Edwards | A01K 97/10 | 248/534 |
| 2011/0185545 A1 * | 8/2011 | Reitzel | F16B 2/10 | 24/510 |

(56) References Cited

U.S. PATENT DOCUMENTS

| | | | |
|---|---|---|---|
| 2012/0305738 A1* | 12/2012 | Gramse | A01K 97/08 248/534 |
| 2014/0047758 A1* | 2/2014 | Ciciulla | A01K 97/10 43/21.2 |
| 2015/0129740 A1* | 5/2015 | Widess | A47G 25/12 248/534 |

FOREIGN PATENT DOCUMENTS

| | | | | |
|---|---|---|---|---|
| GB | 2380223 A | * | 4/2003 | ............. F16B 2/065 |
| GB | 2396542 A | * | 6/2004 | ............. A01K 97/10 |
| JP | 2001292675 A | * | 10/2001 | |
| JP | 2006246826 A | * | 9/2006 | |
| JP | 2008194022 A | * | 8/2008 | |
| JP | 2009297012 A | * | 12/2009 | |
| JP | 2011010558 A | * | 1/2011 | |
| JP | 2013176353 A | * | 9/2013 | |
| KR | 100860492 B1 | * | 9/2008 | |
| KY | NL 1006117 C2 | * | 11/1998 | ............. A01K 97/10 |
| WO | WO9628991 | | 9/1996 | |
| WO | WO 2005006850 A2 | * | 1/2005 | ............. A01K 97/10 |

* cited by examiner

FISHING POLE HOLDER FOR A DOCK RAILING

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of fishing accessories, more specifically, a device that is configured to support a fishing pole to a dock or railing.

SUMMARY OF THE INVENTION

An embodiment of the disclosure meets the needs presented above by generally comprising a clamp assembly that is configured to be secured to a dock railing. The clamp assembly is adjustable, and can secure itself to dock railings of differing geometries. The clamp assembly includes a biasing member that provides a secure connection to the dock railing. The clamp assembly includes a rod holder that extends away from the dock railing. The rod holder is configured to receive a fishing pole there against. The fishing pole is ideally rested on a ground surface, and leans at an acute angle upwardly in defined with a "u"-shaped bracket that enables the fishing rod to rest there against.

These together with additional objects, features and advantages of the fishing pole holder for a dock railing will be readily apparent to those of ordinary skill in the art upon reading the following detailed description of presently preferred, but nonetheless illustrative, embodiments of the fishing pole holder for a dock railing when taken in conjunction with the accompanying drawings.

In this respect, before explaining the current embodiments of the fishing pole holder for a dock railing in detail, it is to be understood that the fishing pole holder for a dock railing is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing pole holder for a dock railing.

It is therefore important that the claims be regarded as including such equivalent construction insofar as they do not depart from the spirit and scope of the fishing pole holder for a dock railing. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the fishing pole holder for a dock railing 100 (hereinafter invention) generally includes a clamp assembly 101 that is configured to be secured to a dock railing 200.

Figure 1:
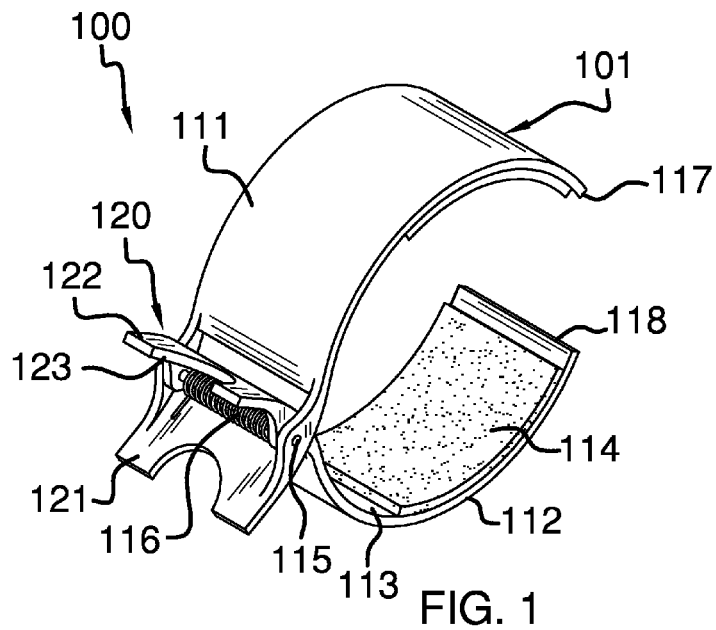
FIG. 1 is a perspective view of an embodiment of the disclosure.
Figure 2:
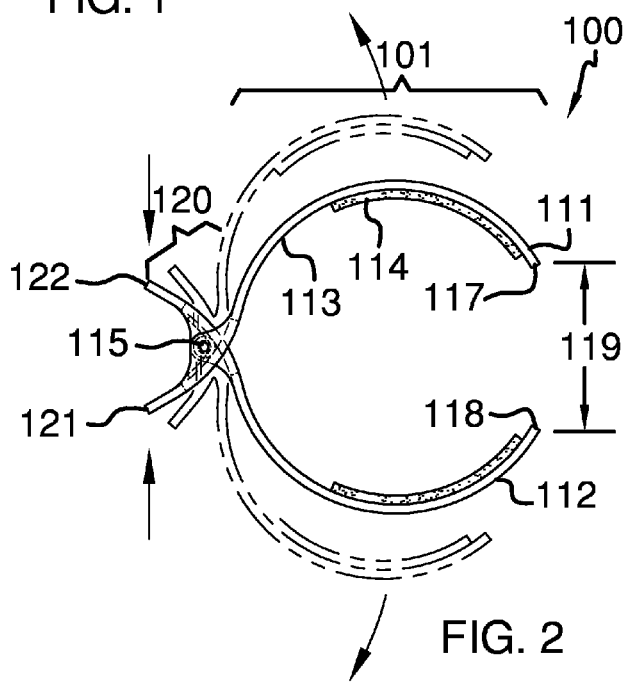
FIG. 2 is a side view of an embodiment of the disclosure.
Figure 3:
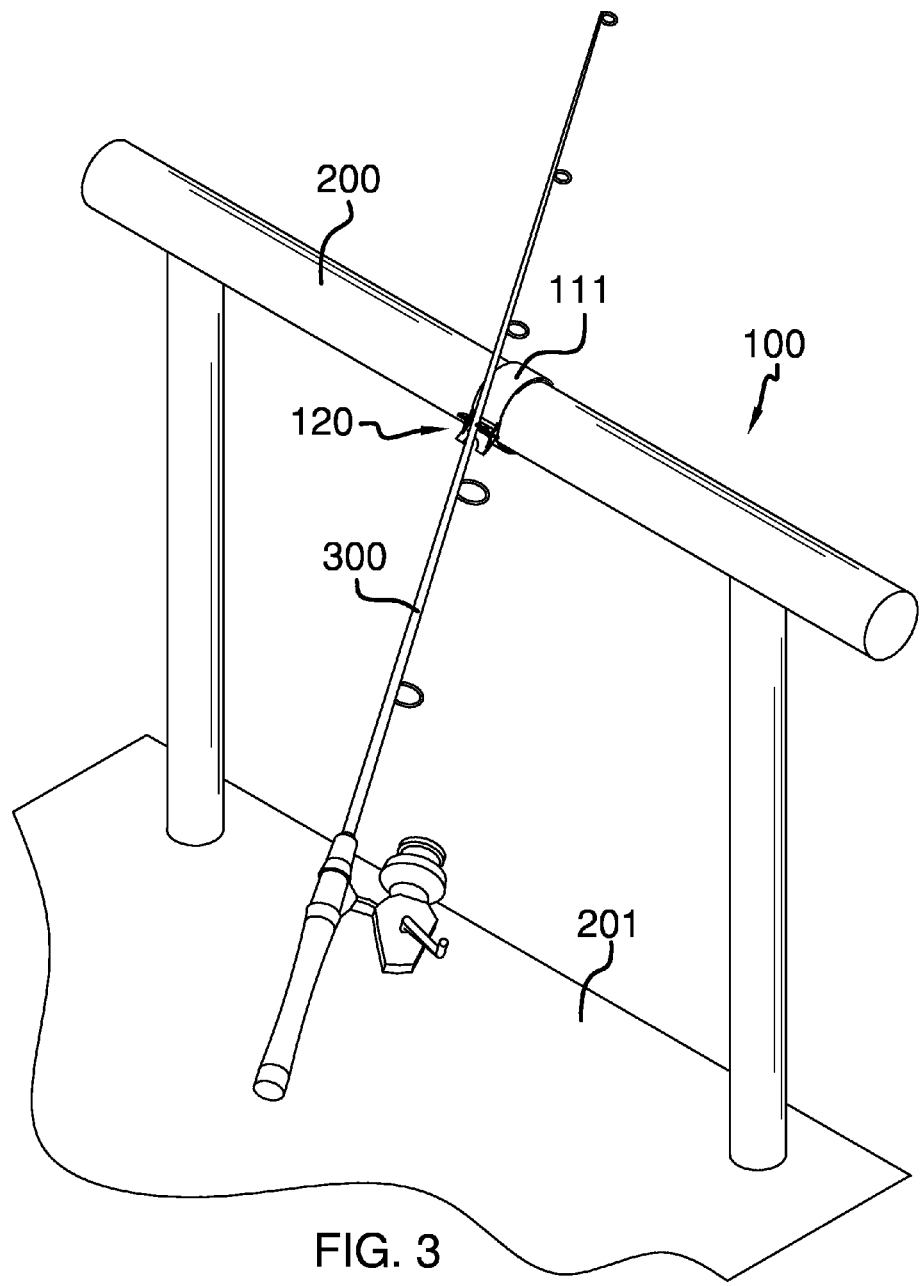
FIG. 3 is a perspective view of an embodiment of the disclosure in use.
Figure 4:
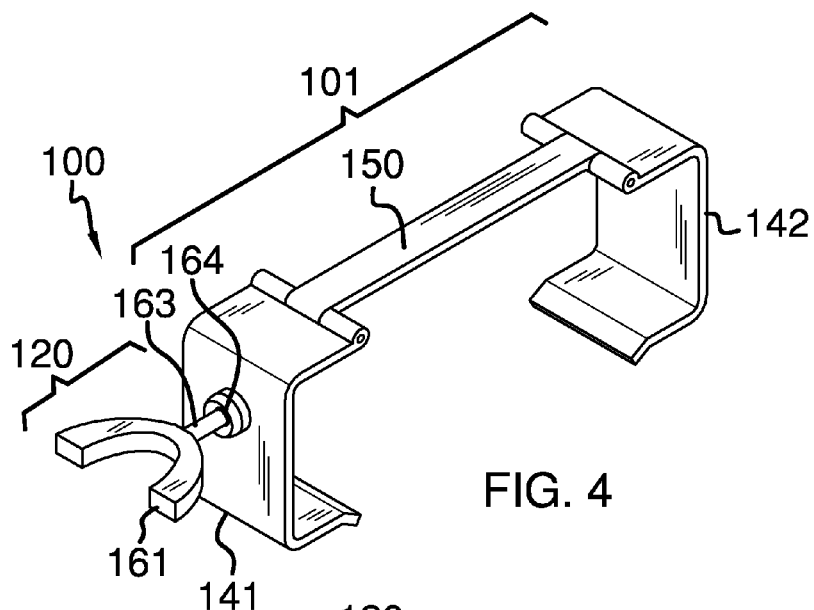
FIG. 4 is a perspective view of a second embodiment of the disclosure.
Figure 5:
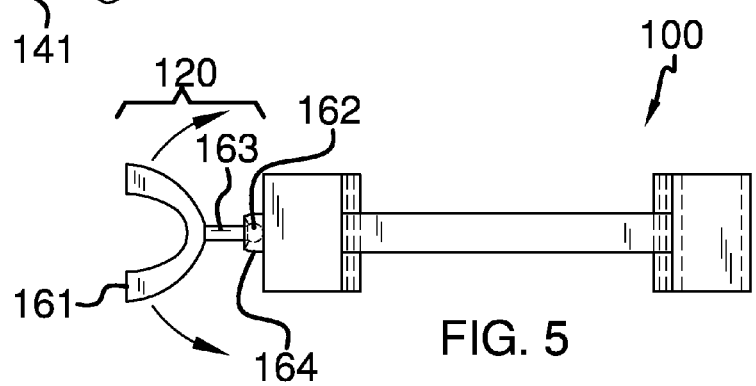
FIG. 5 is a top view of a second embodiment of the disclosure.
Figure 6:
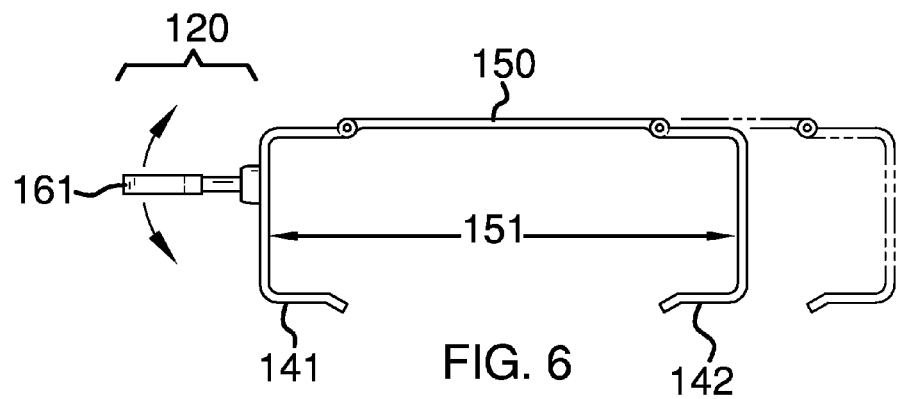
FIG. 6 is a side view of a second embodiment of the disclosure.
Figure 7:
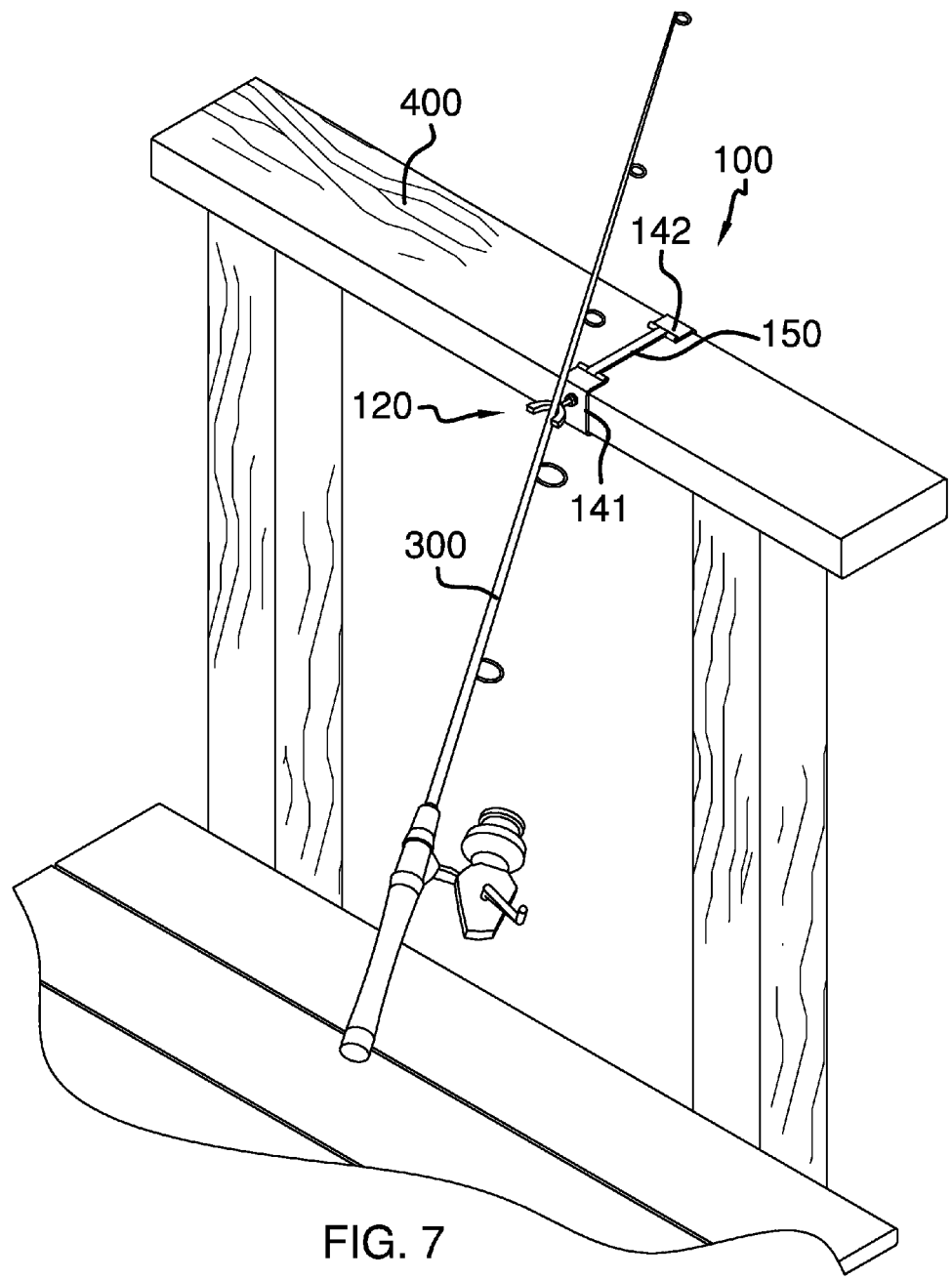
FIG. 7 is a perspective view of a second embodiment of the disclosure in use.

The clamp assembly 101 is adjustable, and can secure itself to dock railings 200 of differing geometries. Referring to FIGS. 1-3, the clamp assembly 101 is further defined with a first clamp armature 111 and a second clamp armature 112. Both the first clamp armature 111 and the second clamp armature 112 have a semi-circular shape, and which are ideally used with a round dock railing 200. The first clamp armature 111 and the second clamp armature 112 are each further defined with an inner clamp surface 113 that is adorned with a gripping member 114. The gripping member 114 is a piece of non-slip rubber that interfaces between the dock railing 200 and the first clamp armature 111 or the second clamp armature 112.

The first clamp armature 111 and the second clamp armature 112 connect at a pivot point 115. The pivot point 115 is essentially a hinge. A biasing member 116 is provided at the pivot point 115, and imposes a biasing force that draws the first clamp armature 111 to the second clamp armature 112. It shall be noted that the first clamp armature 111 includes a first distal end 117 whereas the second clamp armature 112 includes a second distal end 118. The biasing member 116 biases the first distal end 117 towards the second distal end 118 so as to reduce a distal end distance 119.

The clamp assembly 101 includes a rod holder 120. The rod holder 120 extends from the pivot point 115. The rod holder 120 extends in a direction opposite of the first distal end 117 and the second distal end 118 of the clamp assembly 101. The rod holder 120 is comprised of a first rod armature 121 and a second rod armature 122. The first rod armature 121 is an extension of the first clamp armature 111, and the second rod armature 122 is an extension of the second clamp armature 112.

The first clamp armature 111 and the second rod armature 122 cross each other such that the first clamp armature 111 and the second rod armature 122 extend above the pivot point 115 so as to be on an upper side of the clamp assembly and the second clamp armature 112 and the first rod armature 121 extend below the pivot point 115 so as to be on a lower side of the clamp assembly.

Both the first rod armature 121 and the second rod armature 122 include a rod groove 123 integrated therein, and which is configured to enable a fishing rod 300 to rest there against. In use, the invention 100 is secured to the dock railing 200, and the fishing rod 300 is leaned against the rod holder 120. Moreover, the fishing rod 300 is touching a ground surface 201, and leans acutely against the rod grooves 123 of the first rod armature 121 and the second rod armature 122.

Referring to FIGS. 4-7, the invention 100 utilizes a differing embodiment of the clamp assembly 101. Moreover, the clamp assembly 101 is further defined with a third clamp armature 141 and a fourth clamp armature 142. The third clamp armature 141 and the fourth clamp armature 142 are mirrors of one another, and face one another. The third clamp armature 141 and the fourth clamp armature 142 are "C" shaped, which enables the third clamp armature 141 and the fourth clamp armature 142 to be positioned against opposing sides of a second dock railing 400. It shall be noted that the second dock railing 400 may have a square or rectangular cross-section.

The third clamp armature 141 connects to the fourth clamp armature 142 via en elastic member 150. The elastic member 150 is able to stretch in order to adjust a clamp assembly distance 151. The elastic member 150 imposes a biasing force that reduces the clamp assembly distance 151 in order to provide a secure fitting on the second dock railing 400.

The third clamp armature 141 includes the rod holder 120 thereon. The rod holder 120 involves a "U" shaped bracket 161 that includes a bulbous member 162 affixed to a holder armature 163. The bulbous member 162 is inserted into a rod holder receptacle 164 such that the "U" shaped bracket 161 is able to pivot horizontally as well as vertically (see arrows of FIGS. 5-6). The "U" shaped bracket 161 is adapted to receive the fishing rod 300.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fishing pole holder for a dock railing comprising:
   a clamp assembly configured to be secured to a dock railing;
   a rod holder extending from said clamp assembly;
   said rod holder is adapted to support a fishing rod thereagainst;
   wherein the clamp assembly is further defined with a first clamp armature and a second clamp armature;
   wherein both the first clamp armature and the second clamp armature have a semi-circular shape, and which are ideally used with the dock railing that is round;
   wherein the first clamp armature and the second clamp armature are each further defined with an inner clamp surface that is adorned with a gripping member;
   wherein the gripping member is a piece of non-slip rubber that interfaces between the dock railing and the first clamp armature or the second clamp armature when the clamp assembly is secured to the dock railing;
   wherein the first clamp armature and the second clamp armature connect at a pivot point, said pivot point is a hinge;
   wherein a biasing member is provided at the pivot point, and imposes a biasing force that draws the first clamp armature to the second clamp armature;
   wherein the first clamp armature includes a first distal end and the second clamp armature includes a second distal end;
   wherein the biasing member biases the first distal end towards the second distal end so as to reduce a distance between the first and second distal ends;
   wherein the clamp assembly includes the rod holder, which extends from the pivot point;
   wherein the rod holder extends in a direction opposite of the first distal end and the second distal end of the clamp assembly;
   wherein the rod holder is comprised of a first rod armature and a second rod armature;
   wherein the first rod armature is an extension of the first clamp armature, and the second rod armature is an extension of the second clamp armature;
   wherein the first clamp armature and the second clamp armature cross each other such that the first clamp armature and the second rod armature extend above the hinge on an upper side of the clamp assembly and the second clamp armature and the first rod armature extend below the hinge on a lower side of the clamp assembly;
   wherein the first rod armature and the second rod armature each include a rod groove integrated therein, and which is configured to enable the fishing rod to rest there against;
   wherein the fishing rod is touching a ground surface, and leans acutely against the rod grooves of the first rod armature and the second rod armature when said rod holder is supporting the fishing rod.

* * * * *